US012572815B2

(12) United States Patent
Wang et al.

(10) Patent No.: US 12,572,815 B2
(45) Date of Patent: Mar. 10, 2026

(54) SYSTEM AND METHOD FOR TRAINING A REGRESSION NEURAL NETWORK FOR LOCALIZATION OF A DEVICE IN AN ENVIRONMENT

(71) Applicant: Mitsubishi Electric Research Laboratories, Inc., Cambridge, MA (US)

(72) Inventors: Pu Wang, Cambridge, MA (US); Haifeng Xia, New Orleans, LA (US); Toshiaki Koike Akino, Cambridge, MA (US); Ye Wang, Cambridge, MA (US); Philip Orlik, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 646 days.

(21) Appl. No.: 18/048,332

(22) Filed: Oct. 20, 2022

(65) Prior Publication Data

US 2024/0028908 A1     Jan. 25, 2024

Related U.S. Application Data

(60) Provisional application No. 63/369,029, filed on Jul. 21, 2022.

(51) Int. Cl.
G06N 3/094        (2023.01)
G06F 18/213      (2023.01)
(Continued)

(52) U.S. Cl.
CPC ........... G06N 3/094 (2023.01); G06F 18/213 (2023.01); G06F 18/2155 (2023.01); G06F 18/25 (2023.01)

(58) Field of Classification Search
CPC ..... G06N 3/094; G06F 18/25; G06F 18/2155; G06F 18/213
See application file for complete search history.

(56) References Cited

U.S. PATENT DOCUMENTS

| | | | |
|---|---|---|---|
| 2021/0056412 A1* | 2/2021 | Jung | G06N 3/045 |
| 2023/0267175 A1* | 8/2023 | Jain | G06F 18/22 |
| | | | 706/15 |

OTHER PUBLICATIONS

Tian, Yu, Jiankun Wang, and Zenghua Zhao. "Wi-Fi fingerprint update for indoor localization via domain adaptation." In 2021 IEEE 27th International Conference on Parallel and Distributed Systems (ICPADS), pp. 835-842. IEEE, 2021. (Year: 2021).*

(Continued)

*Primary Examiner* — Casey R. Garner
(74) *Attorney, Agent, or Firm* — Gene Vinokur

(57)        ABSTRACT

The present disclosure provides a method and a system for training a neural network suitable for localization of a device within an environment based on signals received by the device. The method comprises training a bi-regressor neural network to identify locations from labeled data, wherein the bi-regressor neural network includes a feature extractor and a bi-regressor including two regressors; training parameters of the bi-regressor using the labeled data and unlabeled data, such that each of the two regressors identifies the same labeled locations while processing the labeled data and identifies different locations while processing the unlabeled data; and training parameters of the feature extractor using an adversarial discriminator to extract domain invariant features from the unlabeled data with statistical properties of the labeled data according to the adversarial discriminator such that each of the two regressors identifies the same locations while processing the domain invariant features.

19 Claims, 8 Drawing Sheets

100

(51) Int. Cl.
    *G06F 18/214*       (2023.01)
    *G06F 18/25*        (2023.01)

(56)            References Cited

OTHER PUBLICATIONS

Li, Shuang, Fangrui Lv, Binhui Xie, Chi Harold Liu, Jian Liang, and Chen Qin. "Bi-classifier determinacy maximization for unsupervised domain adaptation." In Proceedings of the AAAI conference on artificial intelligence, vol. 35, No. 10, pp. 8455-8464. 2021. (Year: 2021).*
Saito, Kuniaki, Kohei Watanabe, Yoshitaka Ushiku, and Tatsuya Harada. "Maximum classifier discrepancy for unsupervised domain adaptation." In Proceedings of the IEEE conference on computer vision and pattern recognition, pp. 3723-3732. 2018. (Year: 2018).*
M. Arnold and F. Schaich, "Indoor positioning systems: Smart fusion of a variety of sensor readings," arXiv:2105.05438, 2021.
H. Xue et al., "DeepFusion: A deep learning framework for the fusion of heterogeneous sensory data," in MobiHoc, 2019, pp. 151-160.
J. Choi and Y.-S. Choi, "Calibration-free positioning technique using Wi-Fi ranging and built-in sensors of mobile devices," IEEE Internet of Things Journal, vol. 8, No. 1, pp. 541-554, 2020.

* cited by examiner

SYSTEM AND METHOD FOR TRAINING A REGRESSION NEURAL NETWORK FOR LOCALIZATION OF A DEVICE IN AN ENVIRONMENT

TECHNICAL FIELD

The present disclosure relates generally to localization of a device, and more specifically to a system and a method for training a regression neural network for localization of a device in an environment.

BACKGROUND

Domain adaptation (DA) aims to transfer knowledge of a well-labeled source domain to facilitate unlabeled target learning. When turning to specific tasks such as indoor (Wi-Fi) localization, it is essential to learn a cross-domain regressor to mitigate domain shift. However, in contrast to classification tasks, such as indoor (Wi-Fi) localization relies on regression since a trained neural network needs to identify locations in a continuous space, while training data can practically come only from samples in discrete locations.

Regression, as a counterpart to classification, is a major paradigm with a wide range of applications. Domain adaptation regression (DAR) extends it by generalizing a regressor from a labeled source domain to an unlabeled target domain. Deep learning has made remarkable changes in diverse regression applications across many fields. Nonetheless, training high-quality deep models relies on large-scale labeled datasets. Further, in many real-world regression applications, precisely annotating abundant training instances is time-consuming and laborious. A solution to such a problem is leveraging off-the-shelf labeled data from a relevant domain and applying domain adaptation approaches to overcome the domain shift or dataset bias.

Deep domain adaptation methods have achieved remarkable advances in a domain adaptation classification (DAC) problems. However, despite these developments in DAC, learning invariant representations in deep regime for DAR is still underdeveloped. One reason for such deficiency lies in difference in loss function during training of classifiers and regressors. A commonly used loss function in regression is squared loss (L2), while in classification it is cross-entropy loss (CE) with softmax activation function. Softmax allows activation values of different categories to compete with each other. Introducing this competition mechanism can make classifiers quickly adapt to changes in feature scales. However, in regression tasks, the regressors may not have such adaptability.

Therefore, there is a need for domain adaptation approach for the regressor.

SUMMARY

Some embodiments are based on the realization that the challenges in domain adaptation of regression neural networks can be addressed using an adversarial discriminator applied to a feature extraction level. An objective of such a discriminator is to train a feature extractor to extract such features from measurements in a target domain that have similar statistical distribution with features extracted from measurements of a source domain. However, arriving at such a discriminator is problematic because the feature extractor is neither classifier nor regressor, so there is a need for an additional referee to judge quality of the extracted features. Such a referee is absent from a typical regression architecture used for the localization of the devices.

To that end, some embodiments disclose a bi-regressor neural network and a three-stage training procedure for the domain adaptive regression. The bi-regressor neural network includes a feature extractor and a bi-regressor including two regressors. The two regressors have identical architecture with potentially different weights and biases. The three-stage training procedure is used to train the bi-regressor neural network for localization of a device within an environment based on signals received by the device located in the environment. The signals may include different types of Radio Frequency (RF) signals at various signal levels such as Received Signal Strength Indicator (RSSI) signals, Channel State Information (CSI) signals. The different types of RF signals include Ultra-Wide Band (UWB) signals, Wi-Fi signals, and Inertial Measurement Unit (IMU) signals. The three-stage training procedure includes training the bi-regressor neural network with labeled data in the environment and/or unlabeled data in a modified or new environment. In an embodiment, the labeled data includes measurements of the signals labeled with coordinates of locations of the measurements. In an embodiment, the unlabeled data includes measurements of the signals at unidentified locations within the environment, such that the measurements of the labeled data and the measurements of the unlabeled data are sampled at the same or different discrete locations of the environment.

Each training stage of the three-stage training procedure is described below. During the first training stage, the bi-regressor neural network is trained using the labeled data to identify locations in a continuous space of the environment from the labeled data. In particular, the feature extractor is trained to extract features from the labeled data and each regressor is trained to determine a location in the continuous space of the environment from the features extracted by the feature extractor. In other words, an objective of each regressor is to learn a regression that can map the extracted features to location of in the continuous space of the environment. The need for two regressors comes from the need to have a referee on the features extracted by the feature extractor and the capability to determine if an input sensor signal is collected from the environment similar to training data or from an unidentified environment.

During the first stage of training, the feature extractor and two regressors are trained with labeled data, based on a loss function $L_r$. As a result, parameters of the two regressors are most likely the same or very similar Hence, when both regressors process the features of the labeled data, both regressors produce similar outputs approximating ground truth data. In an embodiment, the loss function $L_r$ is based on the mean-squared error (MSE) criterion between the labeled data and coordinate estimates.

During the second stage of the training, the two regressors are trained with the labeled data and the unlabeled data to produce the same correct outputs for the labeled data but different outputs for the unlabeled data that are from a different domain. In such a manner, the two regressors are trained to produce different outputs for the unlabeled data if the unlabeled data has statistical distribution different from the statistical distribution of the labelled data. As a result, the two regressors are trained to identify whether the statistical distribution of the unlabeled data has a similar or different distribution from the statistical distribution of the labelled data. As a result, these two regressors can serve as a referee on the similarity between input statistical distribution and the statistical distribution of the labelled data.

Further, the difference in the outputs of both regressors for the unlabeled data may be maximized by minimizing the overlap/similarity between the outputs of both regressors. To minimize the overlap between the outputs of both regressors, the overlap between the bi-regressor outputs needs to be quantified. To quantify such an overlap, some embodiments use the Jaccard Similarity Coefficient (IoU score) from the field of object detection using visual sensors. However, the non-differentiable nature of the IoU score leads to optimization of the bi-regressor neural network weights problematic. To mitigate such a problem, a soft-similarity function $L_s$ is realized. The minimization of the soft-similarity function $L_s$ decreases the overlap between the outputs of the two regressors to further increase the difference in the outputs of the two regressors for the unlabeled data.

However, it is still required that both regressors should produce the same outputs for the labelled data. To that end, in the second stage of the training, rather than only minimizing the soft-similarity function $L_s$, an objective function based on the loss function $L_r$ (used in the first stage of the training) and the soft-similarity function $L_s$ is minimized.

Thus, the combination of the two regressors can be contemplated as an implicit discriminator to directly distinguish the labelled data and the unlabeled data (i.e., to detect target samples outside the source samples/support).

Given these new capabilities of these two regressors, during the third training stage, the feature extractor is trained with an adversarial discriminator to extract domain invariant features of the unlabeled data with the statistical distribution of the labelled data, using these two regressors as a referee. The extracted domain invariant features are such that when processed by the two regressors, each of the two regressors identifies the same locations while processing the domain invariant features.

Some embodiments are based on the recognition that the domain adaptation becomes difficult if the distribution discrepancy is large. As used herein, the distribution discrepancy refers to the difference in the outputs of the two regressors. For example, in case of multi-modal indoor localization, the distribution discrepancy becomes relatively significant due to the fact that the change of one multi-path component may contribute to the whole sensor signal in either a constructive or destructive way. Some embodiments are based on the realization that such a problem can be solved by constructing two intermediate domains between the source and target domains and gradually eliminating their mismatch to achieve the statistical distribution alignment. The intermediate domains are constructed based on data augmentation of the labelled data and the unlabeled data.

At first, a fixed ratio $\lambda$ is chosen, e.g., $\lambda$ is set to 0.7. Based on the fixed $\lambda$, the labeled data and the unlabeled data are linearly combined to synthesize augmented labelled data $$X_s^*$$

and augmented unlabeled data $$X_t^*.\ X_s^*\ \text{and}\ X_t^*$$

4 form the two intermediate domains where $$X_s^*$$

is closer to the source domain and $$X_t^*.\ X_s^*\ \text{and}\ X_t^*$$

is closer to the target domain. Further, an adversarial relationship between the adversarial discriminator and the feature extractor is utilized to mitigate the domain shift between augmented labelled data $$X_s^*$$

and augmented unlabeled data $$X_t^*.$$

For example, the augmented labelled data $$X_s^*$$

and augmented unlabeled data $$X_t^*.\ X_s^*\ \text{and}\ X_t^*$$

are input to the feature extractor and respective outputs are processed by each of the two regressors of the second stage. Further, an adversarial loss function is minimized to mitigate the domain shift between source-similar and target-similar ones.

After executing the above three-stage training procedure, a trained bi-regressor neural network is obtained. The trained bi-regressor neural network includes trained feature extractor and two trained regressors. The trained bi-regressor neural network may be used to determine locations for an input unlabeled data. Here, the two trained regressors of the trained bi-regressor neural network produce similar locations for the input unlabeled data. To that end, some embodiments are based on the realization that an architecture of the trained bi-regressor neural network can include only a single trained regressor rather than two trained regressors, for determining the locations. Alternatively, in some embodiments, the trained bi-regressor neural network may include the trained feature extractor and original regressors (regressors obtained from the first stage of the training), which may provide additional robustness of the regression output.

Accordingly, one embodiment discloses computer-implemented method for training a neural network suitable for localization of a device within an environment based on signals received by the device located in the environment. The method uses a processor with stored instructions implementing the method, wherein the instructions, when executed by the processor carry out steps of the method, comprising: collecting labeled data including measurements of the signals labeled with coordinates of locations of the measurements; collecting unlabeled data including measurements of the signals at unidentified locations within the environment, such that the measurements of the labeled data and the measurements of the unlabeled data are sampled at the same or different discrete locations of the environment; training, during a first training stage using the labeled data, a bi-regressor neural network to identify locations in a continuous space of the environment from the labeled data, wherein the bi-regressor neural network includes a feature extractor configured to extract features from the labeled data and a bi-regressor including two regressors with identical architectures, each regressor is trained to determine a location in the continuous space of the environment from the features received from the feature extractor; training parameters of the bi-regressor, during a second training stage with fixed parameters of the feature extractor trained during the first training stage, using the labeled data and the unlabeled data, such that each of the two regressors identifies the same labeled locations while processing the labeled data and identifies different locations while processing the unlabeled data; and training parameters of the feature extractor using an adversarial discriminator, during a third training stage with fixed parameters of the bi-regressor trained during the second training stage using the labeled data and the unlabeled data, to extract domain invariant features from the unlabeled data with statistical properties of the labeled data according to the adversarial discriminator such that each of the two regressors identifies the same locations while processing the domain invariant features.

Accordingly, another embodiment discloses a system for training a neural network suitable for localization of a device within an environment based on signals received by the device located in the environment. The system comprises a processor, and a memory having instructions stored thereon that, when executed by the processor, cause the system to collect labeled data including measurements of the signals labeled with coordinates of locations of the measurements; collect unlabeled data including measurements of the signals at unidentified locations within the environment, such that the measurements of the labeled data and the measurements of the unlabeled data are sampled at the same or different discrete locations of the environment; train, during a first training stage using the labeled data, a bi-regressor neural network to identify locations in a continuous space of the environment from the labeled data, wherein the bi-regressor neural network includes a feature extractor configured to extract features from the labeled data and a bi-regressor including two regressors with identical architectures, each regressor is trained to determine a location in the continuous space of the environment from the features received from the feature extractor; train parameters of the bi-regressor, during a second training stage with fixed parameters of the feature extractor trained during the first training stage, using the labeled data and the unlabeled data, such that each of the two regressors identifies the same labeled locations while processing the labeled data and identifies different locations while processing the unlabeled data; and train parameters of the feature extractor using an adversarial discriminator, during a third training stage with fixed parameters of the bi-regressor trained during the second training stage using the labeled data and the unlabeled data, to extract domain invariant features from the unlabeled data with statistical properties of the labeled data according to the adversarial discriminator such that each of the two regressors identifies the same locations while processing the domain invariant features.

Accordingly, yet another embodiment discloses a non-transitory computer-readable storage medium embodied thereon a program executable by a processor for performing a method for training a neural network suitable for localization of a device within an environment based on signals received by the device located in the environment. The method comprises: collecting labeled data including measurements of the signals labeled with coordinates of locations of the measurements; collecting unlabeled data including measurements of the signals at unidentified locations within the environment, such that the measurements of the labeled data and the measurements of the unlabeled data are sampled at the same or different discrete locations of the environment; training, during a first training stage using the labeled data, a bi-regressor neural network to identify locations in a continuous space of the environment from the labeled data, wherein the bi-regressor neural network includes a feature extractor configured to extract features from the labeled data and a bi-regressor including two regressors with identical architectures, each regressor is trained to determine a location in the continuous space of the environment from the features received from the feature extractor; training parameters of the bi-regressor, during a second training stage with fixed parameters of the feature extractor trained during the first training stage, using the labeled data and the unlabeled data, such that each of the two regressors identifies the same labeled locations while processing the labeled data and identifies different locations while processing the unlabeled data; and training parameters of the feature extractor using an adversarial discriminator, during a third training stage with fixed parameters of the bi-regressor trained during the second training stage using the labeled data and the unlabeled data, to extract domain invariant features from the unlabeled data with statistical properties of the labeled data according to the adversarial discriminator such that each of the two regressors identifies the same locations while processing the domain invariant features.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Figure 1A:
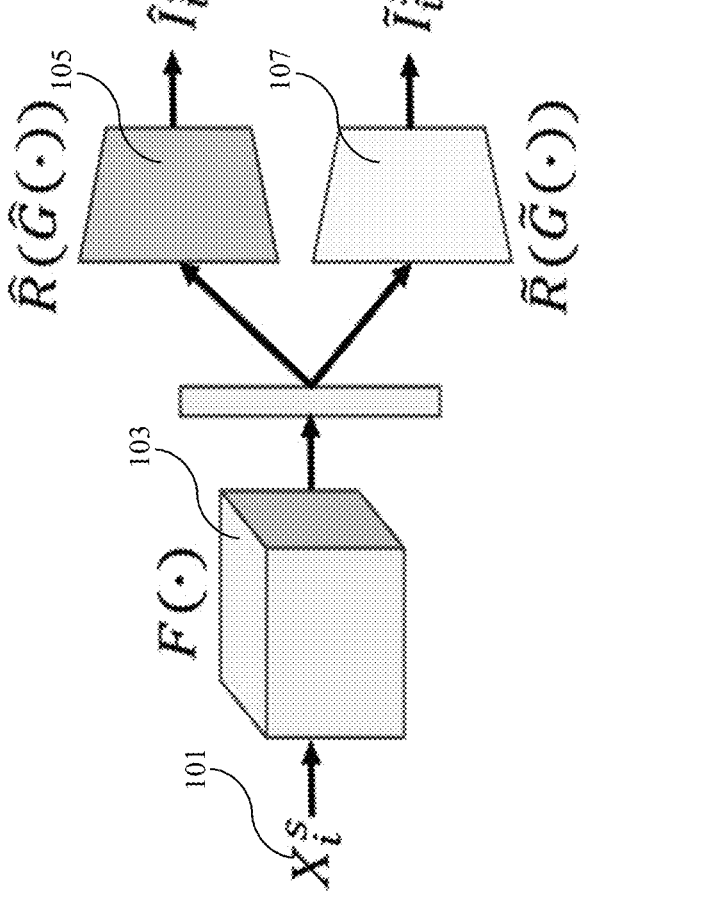
FIG. 1A shows a schematic of an architecture of a bi-regressor neural network, according to some embodiments of the present disclosure.
Figure 1A:

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Domain adaptation (DA) aims to transfer knowledge of a well-labeled source domain to facilitate unlabeled target learning. When turning to specific tasks such as indoor (Wi-Fi) localization, it is essential to learn a cross-domain regressor to mitigate the domain shift. However, in contrast to classification tasks, such as indoor (Wi-Fi) localization relies on regression since a trained neural network needs to identify locations in a continuous space, while training data can practically come only from samples in discrete locations.

Regression is a technique for determining a relationship between independent variables or features and a dependent variable or outcome. Regression may be used as a method for predictive modelling in machine learning, in which an algorithm is used to predict continuous outcomes. Domain adaptation regression extends the regression by generalizing a regressor from a labeled source domain to an unlabeled target domain.

For example, a regressor may be trained with labeled data in one environment. However, during online test phase, the regressor may receive unlabeled data in a new environment. As a result, the regressor trained with the labeled data may suffer from performance degradation when the regressor processes the unlabeled data. To that end, there is a need for domain adaptation approaches for the regressor.

Some embodiments are based on the realization that the challenges in domain adaptation of regression neural networks can be addressed using an adversarial discriminator applied to a feature extraction level. An objective of such a discriminator is to train a feature extractor to extract such features from measurements in a target domain that have similar statistical distribution with features extracted from measurements of a source domain. However, arriving at such a discriminator is problematic because the feature extractor is neither classifier nor regressor, so there is a need for an additional referee to judge quality of the extracted features. Such a referee is absent from a typical regression architecture used for the localization of the devices.

To that end, some embodiments disclose a bi-regressor neural network and a three-stage training procedure for the domain adaptive regression. FIG. 1A shows a schematic of an architecture of a bi-regressor neural network 100, according to some embodiments of the present disclosure. The bi-regressor neural network 100 includes a feature extractor F(•) 103 and a bi-regressor including two regressors 105 and 107. $\{\hat{G}, \hat{R}\}$ and $\{\tilde{G}, \tilde{R}\}$ are components of the two regressors 105 and 107, respectively. The two regressors 105 and 107 have identical architectures. The three-stage training procedure is used to train the bi-regressor neural network 100 for localization of a device within an environment based on signals received by the device located in the environment. The signals may include different types of Radio Frequency (RF) signals at various signal levels such as Received Signal Strength Indicator (RSSI) signals, Channel State Information (CSI) signals. The different types of RF signals include Ultra-Wide Band (UWB) signals, Wi-Fi signals, and Inertial Measurement Unit (IMU) signals. The three-stage training procedure includes training the bi-regressor neural network 100 with labeled data 101 and/or unlabeled data. In an embodiment, the labeled data 101 includes measurements of the signals labeled with coordinates of locations of the measurements. In an embodiment, the unlabeled data includes measurements of the signals at unidentified locations within the environment, such that the measurements of the labeled data 101 and the measurements of the unlabeled data are sampled at the same or different discrete locations of the environment.

Each training stage of the three-stage training procedure is described below.

During a first training stage, the bi-regressor neural network 100 is trained using the labeled data 101 to identify locations in a continuous space of the environment from the labeled data 101. In particular, the feature extractor 103 is trained to extract features from the labeled data 101 and each regressor, i.e., 105 and 107, is trained to determine a location in the continuous space of the environment from the features extracted by the feature extractor 103. In other words, an objective of each regressor is to learn a regression that can map the extracted features to location in the continuous space of the environment. The need for two regressors 105 and 107 comes from the need to have a referee on the features extracted by the feature extractor 103.

In some embodiments, during the first training stage, the feature extractor 101 and two regressors 105 and 107 are trained with the labeled data 101, based on a loss function Lr. As a result, parameters of the two regressors 105 and 107 are mostly similar. Hence, when the two regressors 105 and 107 process the extracted features, the two regressors 105 and 107 produce similar labeled locations approximating ground truth data. In an embodiment, the loss function Lr is based on a mean-squared error (MSE) criterion. For example, the first training stage is executed via a supervised manner as $$\min_{F,\hat{G},\tilde{G},\hat{R},\tilde{R}} \mathcal{L}_r = \sum_{i=1}^{n_s}\left(\mathcal{L}_r^*(\hat{l}_i^s, l_i^s) + \mathcal{L}_r^*(\tilde{l}_i^s, l_i^s)\right),$$

where $$L_r^*$$

is the MSE loss, $$I_i^s$$

is the ground-truth data, $$\hat{I}_i^s$$

is output of the regressor 105, and $$\tilde{I}_i^s$$

is output of the regressor 107.

Figure 1B:
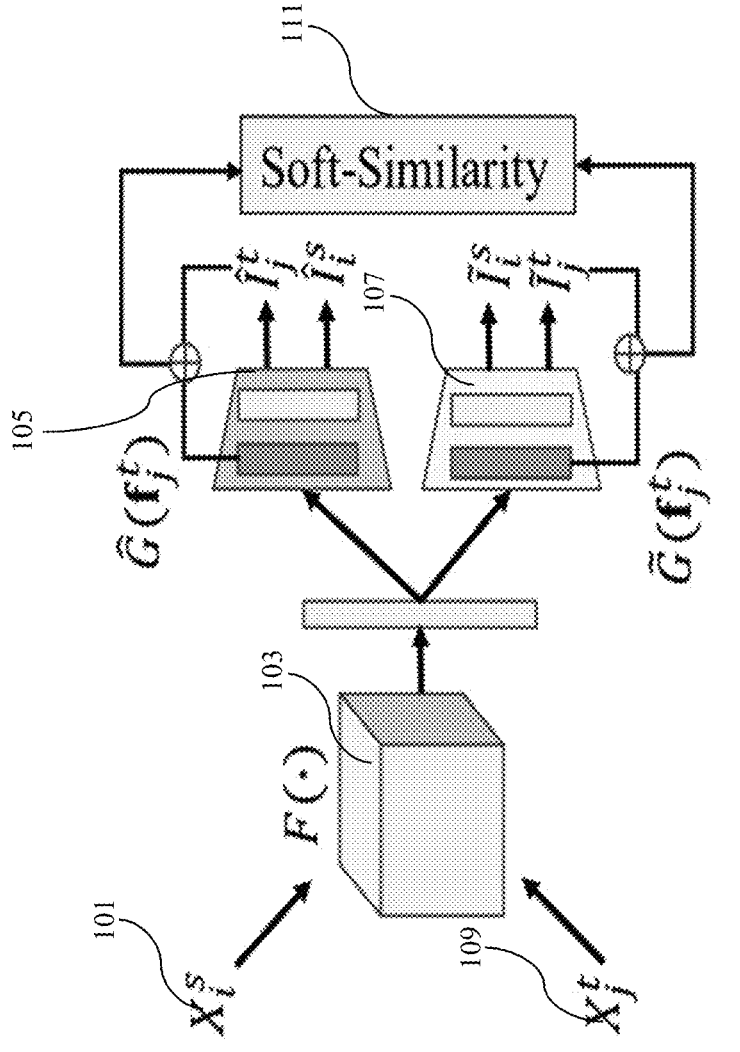
FIG. 1B shows a schematic of a second training stage, according to some embodiments of the present disclosure.

FIG. 1B shows a schematic of a second training stage, according to some embodiments of the present disclosure. During the second stage of the training, parameters of the feature extractor 101 trained during the first training stage are fixed and the two regressors 105 and 107 are trained with the labeled data 101 and unlabeled data 109 to produce the same correct labeled locations for the labeled data 101 but different locations for the unlabeled data 109. In such a manner, the two regressors 105 and 107 are trained to produce different outputs (i.e., locations) for the unlabeled data 109 if the unlabeled data 109 has statistical distribution different from statistical distribution of the labelled data 101. As a result, the two regressors 105 and 107 are trained to identify whether the statistical distribution of the unlabeled data 109 has a similar or different distribution from the statistical distribution of the labelled data 101. As a result, the two regressors 105 and 107 can serve as a referee on the statistical distribution.

Further, the difference in the outputs of the two regressors 105 and 107 for the unlabeled data may be maximized by minimizing overlap/similarity between the two regressors 105 and 107. To minimize the overlap between the two regressors 105 and 107, the overlap between the outputs of the two regressors needs to be quantified. To quantify the overlap between the two regressors 105 and 107, some embodiments use Jaccard Similarity Coefficient (IoU score) from the field of object detection using visual sensors. However, the non-differentiable nature of the IoU score leads to optimization of the bi-regressor neural network 100 weights problematic. To mitigate such a problem, a soft-similarity function Ls 111 between concatenated outputs of the two components G and R of the two regressors is realized. Denote an output of the first regression component as G (f) and an output of the second regression component as R (G (f)) which is also an output of the regression. The concatenated output h=[G, R (G (f))]. For the unlabeled data, $$\hat{h}_i^t = \left[\hat{g}_i^t, \hat{I}_i^t\right]$$

$$\tilde{h}_i^t = \left[\tilde{g}_i^t, \tilde{I}_i^t\right]$$

at an intermediate and final output of the two regressors. Minimization of the soft-similarity function Ls 111 reduces the overlap between the two regressors 105 and 107 to further increase the difference in the outputs of the two regressors 105 and 107 for the unlabeled data 109. In an embodiment, the soft-similarity function Ls 111 is given as $$\mathcal{L}_s = \sum_{i=1}^{n_t} \frac{\left\langle \hat{h}_i^t, \tilde{h}_i^t \right\rangle}{\sum_d \left(\hat{h}_i^t + \tilde{h}_i^t - \hat{h}_i^t \otimes \tilde{h}_i^t\right)},$$

where $\langle \cdot, \cdot \rangle$ is an inner-product suggesting an intersection of $$\hat{h}_i^t \text{ and } \tilde{h}_i^t,$$

$\otimes$ is an element-wise product, and d is a dimension size of $$h_i^t(h \in \{\hat{h}, \tilde{h}\}).$$

However, it is still required that the two regressors 105 and 107 should produce the same outputs for the labelled data 101. To that end, in the second stage of the training, rather than only minimizing the soft-similarity function Ls 111, an objective function based on the loss function Lr (used in the first stage of the training) and the soft-similarity function Ls 111 is minimized. The objective function minimization is given as $$\min_{\hat{G},\tilde{G},\hat{R},\tilde{R}} \mathcal{L}_r + \mathcal{L}_s.$$

Thus, the combination of the two regressors 105 and 107 can be contemplated as an implicit discriminator to directly distinguish the labelled data 101 and the unlabeled data 109.

Figure 1C:
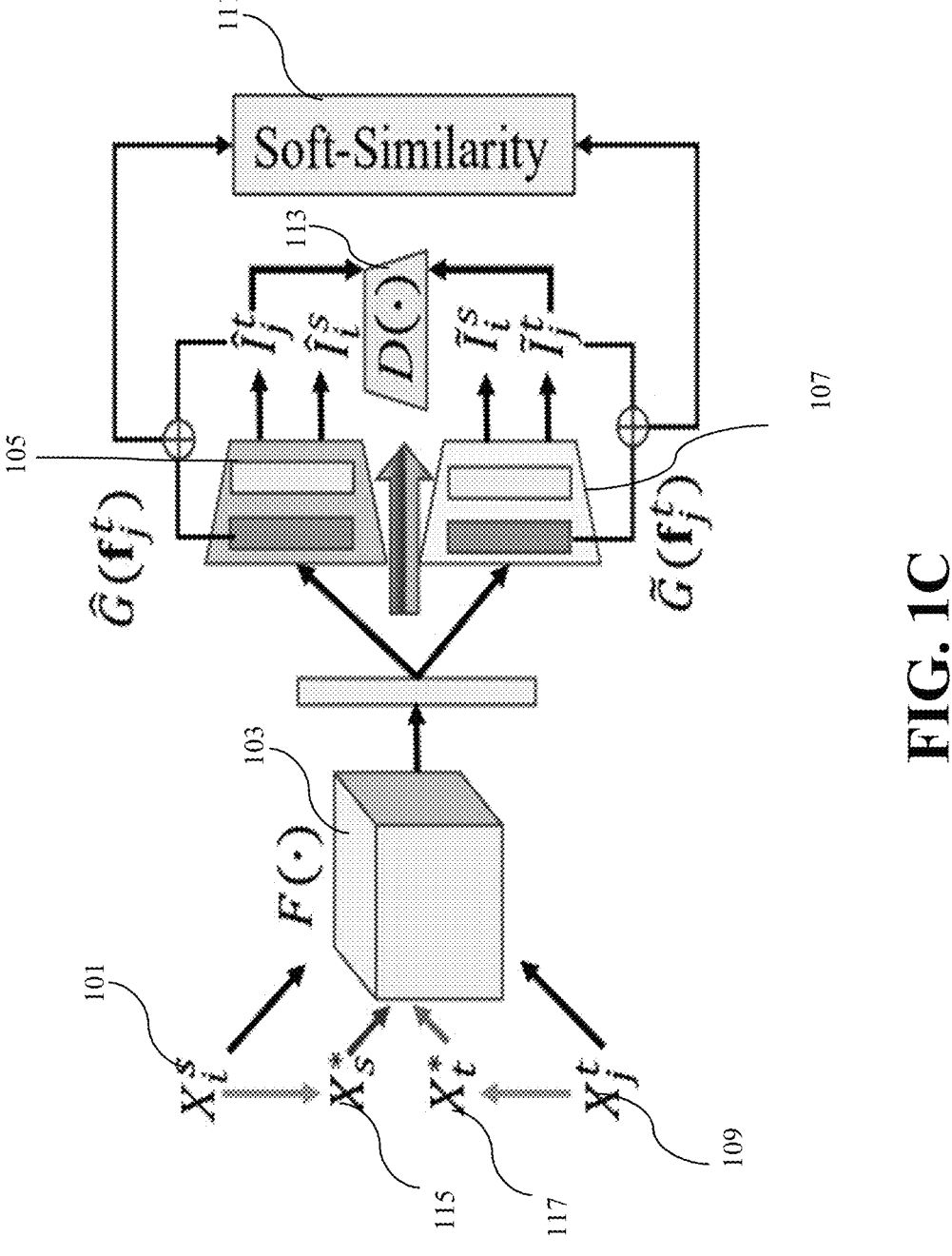
FIG. 1C shows a schematic of a third training stage, according to some embodiments of the present disclosure.

FIG. 1C shows a schematic of a third training stage, according to some embodiments of the present disclosure. In the third training stage, parameters of the feature extractor 103 are trained using an adversarial discriminator 113, with fixed parameters of the two regressors 105 and 107 trained during the second training stage using the labeled data and the unlabeled data. During the third training stage, the parameters of the feature extractor 103 are trained with the adversarial discriminator 113 to extract domain invariant features of the unlabeled data 109 with the statistical distribution of the labelled data 101, using the two regressors 105 and 107 as a referee. The extracted domain invariant features are such that when processed by the two regressors 105 and 107, each of the two regressors 105 and 107 identify the same locations while processing the domain invariant features.

Additionally, some embodiments are based on the recognition that the domain adaptation becomes difficult if the distribution discrepancy is large. As used herein, the distribution discrepancy refers to the difference in the outputs of the two regressors 105 and 107. For example, in case of multi-modal indoor localization, the distribution discrepancy becomes relatively significant. Some embodiments are based on the realization that such a problem can be solved by constructing two intermediate domains between the source and target domains and gradually eliminating their mismatch to achieve statistical distribution alignment. The intermediate domains are constructed based on data augmentation of the labelled data 101 and the unlabeled data 109. At first, a fixed ratio $\lambda$ is chosen, e.g., $\lambda$ is set to 0.7.

11

Based on the fixed λ, the labeled data and the unlabeled data are linearly combined to synthesize augmented labelled data $$X_s^*$$

115 and augmented unlabeled data $$X_t^*, X_s^* \text{ and } X_t^*$$

117 as:

$$X_s^* = \lambda X_i^s + (1-\lambda)X_j^t, \ X_t^* = (1-\lambda)X_i^s + \lambda X_j^t,$$

$$X_s^* \text{ and } X_t^*$$

form two intermediate domains where the augmented labelled data $$X_s^*$$

115 is similar to the source domain (or labeled data 105) and the augmented unlabeled data $$X_t^*, X_s^* \text{ and } X_t^*$$

117 is similar to the target domain (or unlabeled data 107). Further, an adversarial relationship between the adversarial discriminator 113 and the feature extractor 103 is utilized to mitigate the domain shift between the augmented labelled data $$X_s^*$$

115 and the augmented unlabeled data $$X_t^*, X_s^* \text{ and } X_t^*$$

117. For example, the augmented labelled data $$X_s^*$$

115 and the augmented unlabeled data $$X_t^*$$

12

117 are input to the feature extractor 103 and respective outputs are processed by each of the two regressors 105 and 107 of the second stage to output $$f_*^{s/t} = F\big(X_{s/t}^*\big), \ \hat{l}_*^s = \hat{R}\big(\hat{G}\big(\hat{f}_*^s\big)\big) \text{ and } \hat{l}_*^t = \hat{R}\big(\hat{G}\big(\hat{f}_*^t\big)\big).$$

Further, an adversarial loss function is adopted as $$\mathcal{L}_{adv} = \mathbb{E}_{X_s^* \sim \mathcal{D}_s^*} \log\big[D\big(f_*^s, \ \hat{l}_*^s\big)\big] + \mathbb{E}_{X_t^* \sim \mathcal{D}_t^*} \log\big[1 - D\big(f_*^t, \ \hat{l}_*^t\big)\big],$$

where $$\mathcal{D}_{s/t}^*$$

denotes source-similar or target-similar domain and D(·) is the adversarial discriminator 113. To that end, mathematically, the third training stage is given as:

$$\min_F \mathcal{L}_{adv} - \mathcal{L}_s, \ \max_D \mathcal{L}_{adv}.$$

After executing the above three-stage training procedure, a trained bi-regressor neural network is obtained. During online, i.e., the real-time phase, the trained bi-regressor neural network may be used to determine the location of the device in the environment for an input unlabeled data.

Figure 2A:
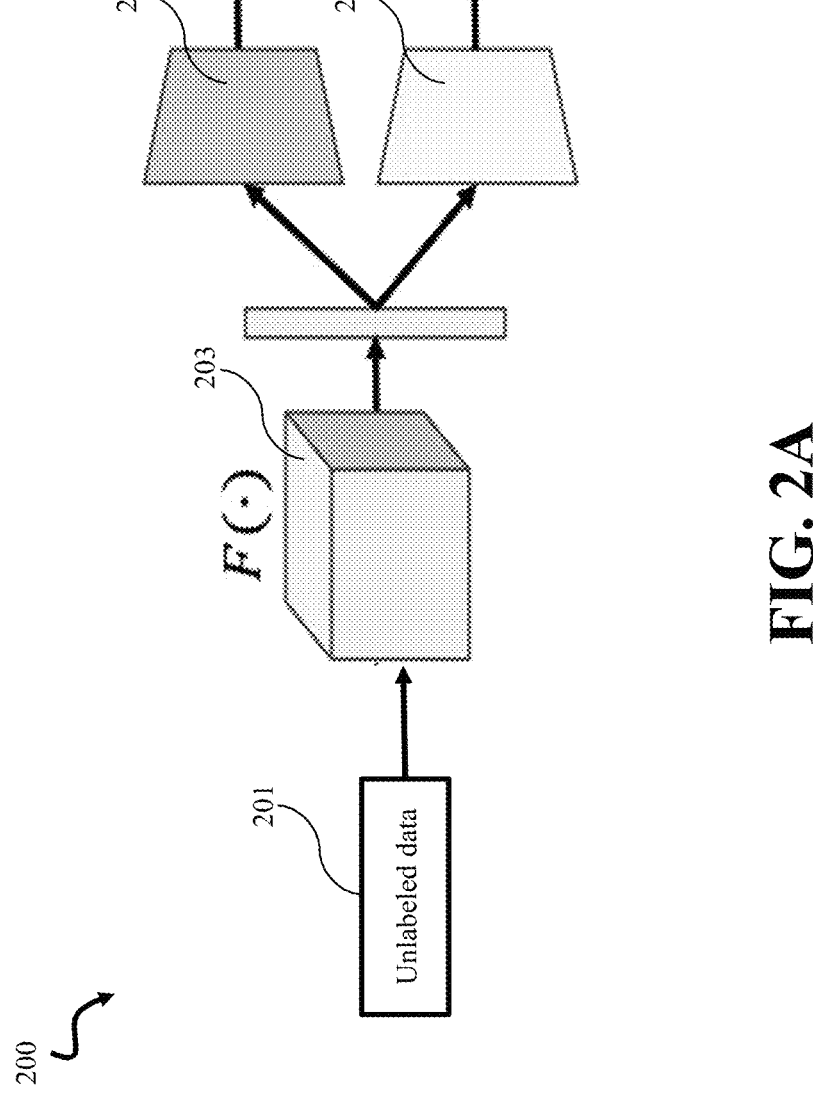
FIG. 2A shows a schematic of an architecture of a trained bi-regressor neural network for determining a location of a device for an input unlabeled data, according to some embodiments of the present disclosure.

FIG. 2A shows a schematic of an architecture of a trained bi-regressor neural network 200 for determining the location of the device for an input unlabeled data 201, according to some embodiments of the present disclosure. The trained bi-regressor neural network 200 includes a trained feature extractor 203 obtained from the third training stage and two trained regressors 205 and 207 obtained from the second training stage. The unlabeled data 201 is input to the trained feature extractor 203. The trained feature extractor 203 extracts domain invariant features from the unlabeled data 201. Further, the extracted domain invariant features are processed by the two trained regressors 205 and 207. Each of the two trained regressors 205 and 207 outputs same locations of the device in the environment.

Since the two trained regressors 205 and 207 of the trained bi-regressor neural network 200 output the same locations for the input unlabeled data 201, some embodiments are based on the realization that an architecture of the trained bi-regressor neural network 200 can include only one trained regressor rather than two trained regressors, for determining the locations. Such an architecture of the bi-regressor neural network is shown in FIG. 2B.

Figure 2B:
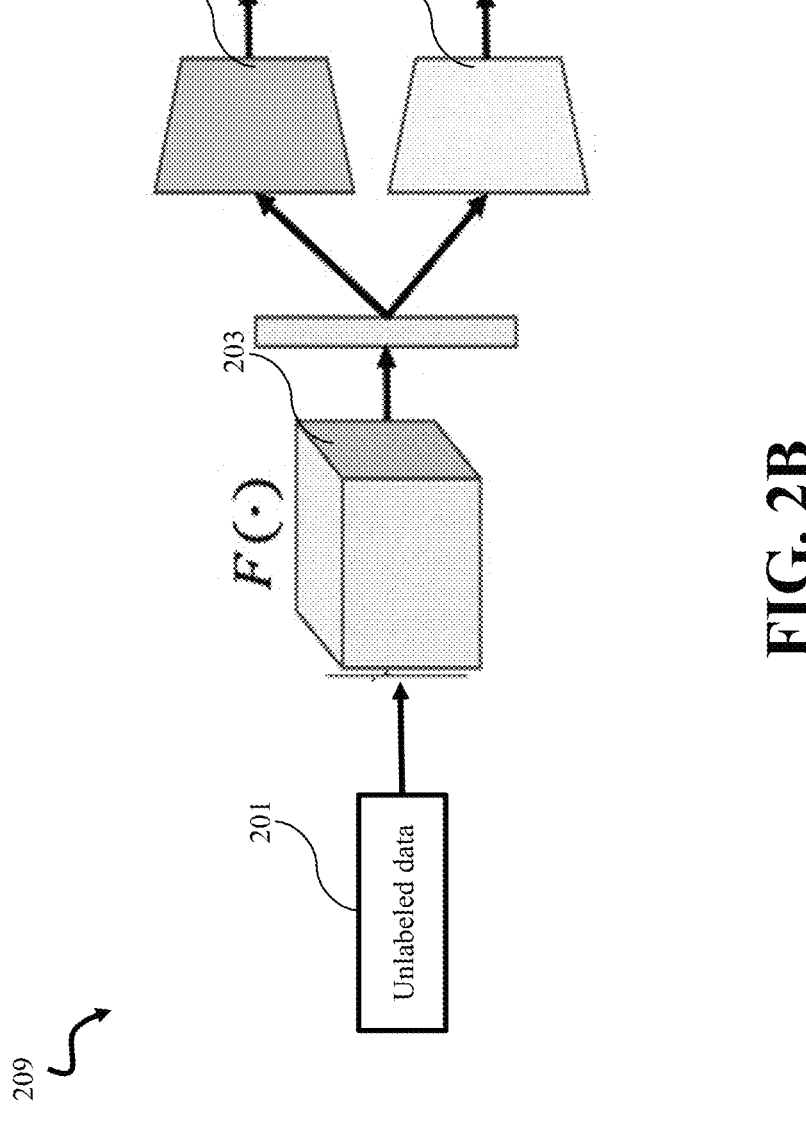
FIG. 2B shows an architecture of a bi-regressor neural network for determining the location of the device, wherein the bi-regressor neural network includes a single trained regressor, according to some embodiments of the present disclosure.

FIG. 2B shows an architecture of a bi-regressor neural network 209 for determining the locations, according to some other embodiments of the present disclosure. The bi-regressor neural network 209 includes the trained feature extractor 203 and the trained regressor 207. The unlabeled data 201 is input to the trained feature extractor 203. The trained feature extractor 203 extracts the domain invariant features from the unlabeled data 201. Further, the extracted domain invariant features are processed by the trained regressor 207 to output the locations of the device in the environment.

Alternatively, in some embodiments, the bi-regressor neural network 209 may include the trained regressor 205 instead of the trained regressor 207.

Figure 2C:
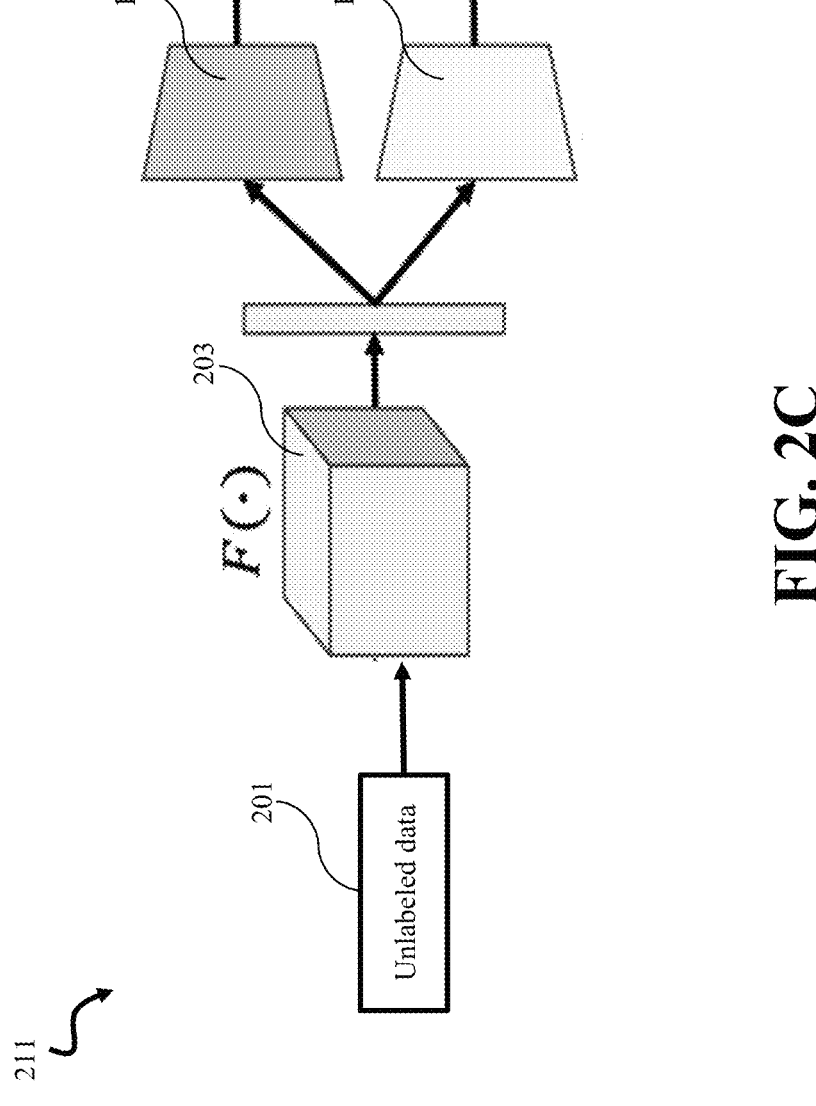
FIG. 2C shows an architecture of a bi-regressor neural network for determining the location of the device, according to some other embodiments of the present disclosure.

Some embodiments are based on the realization that the trained bi-regressor neural network for determining the locations may include the trained feature extractor 203 and original regressors (regressors obtained from the first stage of the training) Such a bi-regressor neural network is shown in FIG. 2C. FIG. 2C shows an architecture of a bi-regressor neural network 211 for determining the locations, according to some other alternate embodiments of the present disclosure. The bi-regressor neural network 211 includes the trained feature extractor 203 obtained from the third training stage and the two regressors 105 and 107 obtained from the first training stage. Alternatively, in some embodiments, the bi-regressor neural network 211 may include the trained feature extractor 203 obtained from the third training stage and one of the two regressors 105 and 107 obtained from the first training stage.

According to some embodiments, the location of the device in the environment outputted by the trained bi-regressor neural network (e.g., trained bi-regressor neural network 200 or 209) may be used for controlling the device in the environment to perform a task. For example, the device may be a robot and the environment may be an autonomous factory. Based on the location of the robot in the autonomous factory, the robot may be controlled to perform the task, such reaching a target location, as described below in FIG. 3.

Figure 3:
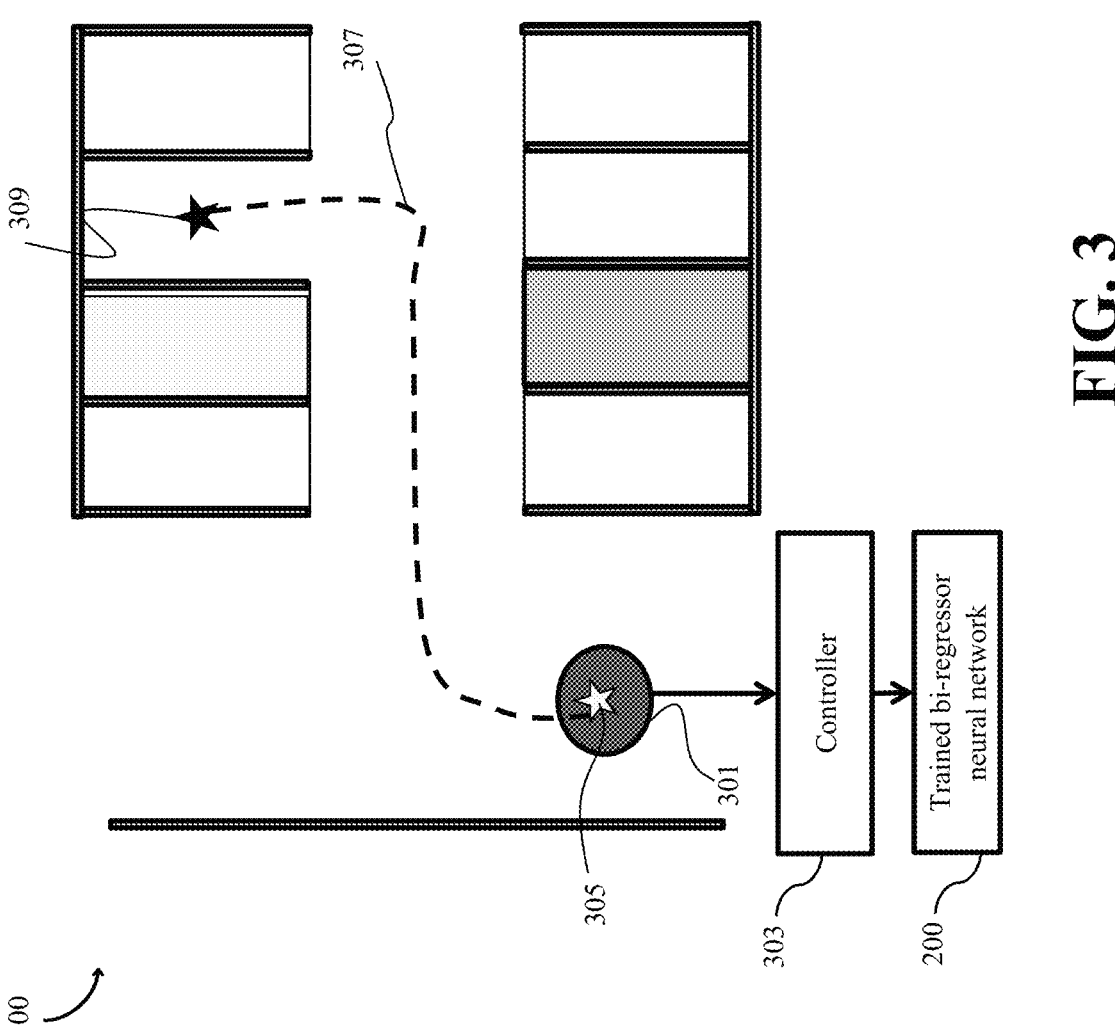
FIG. 3 illustrates controlling of a robot in an autonomous factory, according to some embodiments of the present disclosure.

FIG. 3 illustrates controlling of a robot 301 in an autonomous factory 300, according to some embodiments of the present disclosure. The robot 301 is embedded with the trained bi-regressor neural network 200. Further, the robot 301 includes a controller 303. The robot 301 receives unlabeled data including measurements of the signals at unidentified locations within the autonomous factory 300. The unlabeled data is input to the trained bi-regressor neural network 200 to determine a location 305 of the robot 301 in the autonomous factory 300. Based on the location 305 of the robot 301, the controller 303 determines a motion path 307 that connects the location 303 and a target location 309 in the autonomous factory 300. Further, the controller 303 controls the robot 301 according to the motion path 307. In some alternate embodiments, the controller 303 may make decision in respect of obstacle avoidance, based on the location 305 of the robot 301.

Additionally, in some embodiments, the robot 301 may be also tracked in the autonomous factory 300, based on the location of the robot 301. Additionally or alternatively, the trained bi-regressor neural network 200 can be used in any environment, such as the autonomous factory 300, a warehouse, or a smart home, where asset (such as robot) tracking is required or crucial.

Figure 4:
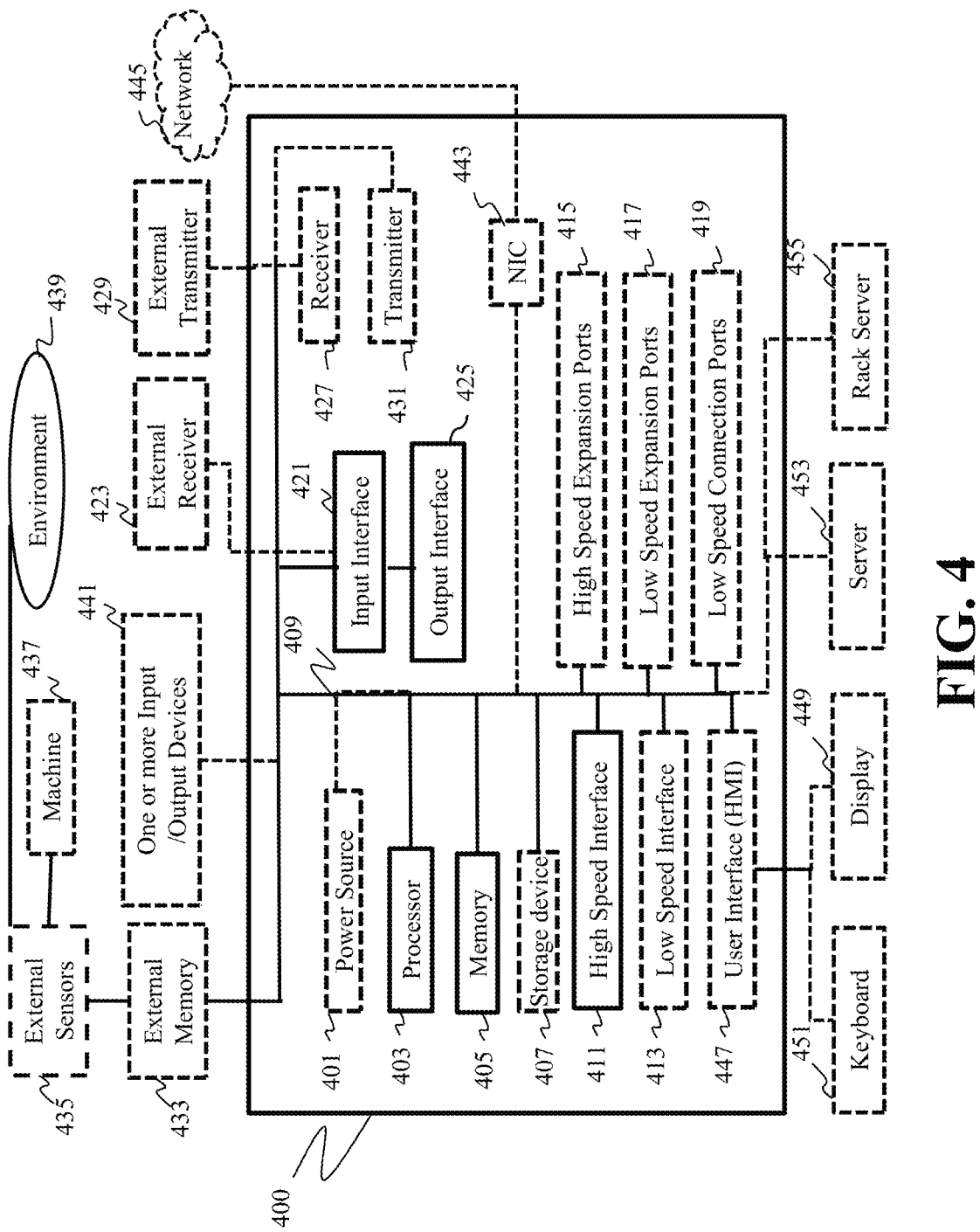
FIG. 4 is a schematic illustrating a system for training a neural network suitable for localization of a device within an environment, according to some embodiments of the present disclosure.

FIG. 4 is a schematic illustrating a system 400 for implementing the methods of the present disclosure. The computing device 400 includes a power source 401, a processor 403, a memory 405, a storage device 407, all connected to a bus 409. Further, a high-speed interface 411, a low-speed interface 413, high-speed expansion ports 415 and low speed connection ports 417, can be connected to the bus 409. In addition, a low-speed expansion port 419 is in connection with the bus 409. Further, an input interface 421 can be connected via the bus 409 to an external receiver 423 and an output interface 425. A receiver 427 can be connected to an external transmitter 429 and a transmitter 431 via the bus 409. Also connected to the bus 409 can be an external memory 433, external sensors 435, machine(s) 437, and an environment 439. Further, one or more external input/output devices 441 can be connected to the bus 409. A network interface controller (NIC) 443 can be adapted to connect through the bus 409 to a network 445, wherein data or other data, among other things, can be rendered on a third-party display device, third party imaging device, and/or third-party printing device outside of the computing device 400.

The memory 405 can store instructions that are executable by the computing device 400 and any data that can be utilized by the methods and systems of the present disclosure. The memory 405 can include random access memory (RAM), read only memory (ROM), flash memory, or any other suitable memory systems. The memory 405 can be a volatile memory unit or units, and/or a non-volatile memory unit or units. The memory 405 may also be another form of computer-readable medium, such as a magnetic or optical disk.

The storage device 407 can be adapted to store supplementary data and/or software modules used by the computer device 400. The storage device 407 can include a hard drive, an optical drive, a thumb-drive, an array of drives, or any combinations thereof. Further, the storage device 407 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 403), perform one or more methods, such as those described above.

The computing device 400 can be linked through the bus 409, optionally, to a display interface or user Interface (HMI) 447 adapted to connect the computing device 400 to a display device 449 and a keyboard 451, wherein the display device 449 can include a computer monitor, camera, television, projector, or mobile device, among others. In some implementations, the computer device 400 may include a printer interface to connect to a printing device, wherein the printing device can include a liquid inkjet printer, solid ink printer, large-scale commercial printer, thermal printer, UV printer, or dye-sublimation printer, among others.

The high-speed interface 411 manages bandwidth-intensive operations for the computing device 400, while the low-speed interface 413 manages lower bandwidth-intensive operations. Such allocation of functions is an example only. In some implementations, the high-speed interface 411 can be coupled to the memory 405, the user interface (HMI) 444, and to the keyboard 451 and the display 449 (e.g., through a graphics processor or accelerator), and to the high-speed expansion ports 415, which may accept various expansion cards via the bus 409.

In an implementation, the low-speed interface 413 is coupled to the storage device 407 and the low-speed expansion ports 417, via the bus 409. The low-speed expansion ports 417, which may include various communication ports (e.g., USB, Bluetooth, Ethernet, wireless Ethernet) may be coupled to the one or more input/output devices 441. The computing device 400 may be connected to a server 453 and a rack server 455. The computing device 400 may be implemented in several different forms. For example, the computing device 400 may be implemented as part of the rack server 455.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A computer-implemented method for training a neural network suitable for localization of a device within an environment based on signals received by the device located in the environment, wherein the method uses a processor with stored instructions implementing the method, wherein the instructions, when executed by the processor carry out steps of the method, comprising:

collecting labeled data including measurements of the signals labeled with coordinates of locations of the measurements;

collecting unlabeled data including measurements of the signals at unidentified locations within the environment, such that the measurements of the labeled data and the measurements of the unlabeled data are sampled at the same or different discrete locations of the environment;

training, during a first training stage using the labeled data, a bi-regressor neural network to identify locations in a continuous space of the environment from the labeled data, wherein the bi-regressor neural network includes a feature extractor configured to extract features from the labeled data and a bi-regressor including two regressors with identical architectures, each regressor is trained to determine a location in the continuous space of the environment from the features received from the feature extractor;

training parameters of the bi-regressor, during a second training stage with fixed parameters of the feature extractor trained during the first training stage, using the labeled data and the unlabeled data, such that each of the two regressors identifies the same labeled locations while processing the labeled data and identifies different locations while processing the unlabeled data;

training parameters of the feature extractor using an adversarial discriminator, during a third training stage with fixed parameters of the bi-regressor trained during the second training stage using the labeled data and the unlabeled data, to extract domain invariant features from the unlabeled data with statistical properties of the labeled data according to the adversarial discriminator such that each of the two regressors identifies the same locations while processing the domain invariant features;

inputting unlabeled data collected by the device to a trained bi-regressor neural network, wherein the trained bi-regressor neural network includes the feature extractor trained during the third training stage and at least one regressor of the two regressors trained during the first training stage using the labeled data; and processing the unlabeled data collected by the device with the trained bi-regressor neural network to output the location of the device in the environment.

2. The computer-implemented method of claim 1, wherein, during the first training stage, the bi-regressor neural network is trained using a loss function such that the each of the two regressors identifies same locations while processing the labeled data, and wherein the loss function is based on a mean-squared error (MSE) criterion.

3. The computer-implemented method of claim 1, wherein, during the second training stage with fixed parameters of the feature extractor trained during the first training stage, the parameters of the bi-regressor are trained based on a soft-similarity function such that each of the two regressors identifies different locations while processing the unlabeled data.

4. The computer-implemented method of claim 3, wherein, during the second training stage with fixed parameters of the feature extractor trained during the first training stage, the parameters of the bi-regressor are trained based on an objective function such that each of the two regressors identifies the same labeled locations while processing the labeled data and identifies different locations while processing the unlabeled data, and wherein the objective function is based on the loss function and the soft-similarity function.

5. The computer-implemented method of claim 3, wherein, during the third training stage with fixed parameters of the bi-regressors trained during the second training stage, the parameters of the feature extractor and the adversarial discriminator are trained based on an adversarial loss function and the soft-similarity function, and wherein the adversarial loss function is configured to mitigate the domain distribution shift.

6. The computer-implemented method of claim 1, wherein, during the third training stage with fixed parameters of the bi-regressors trained during the second training stage, the parameters of the feature extractor and the adversarial discriminator are trained based on maximization of an adversarial loss function.

7. The computer-implemented method of claim 1, wherein the method further comprises determining augmented labeled data and augmented unlabeled data forming more than one intermediate domains.

8. The computer-implemented method of claim 7, wherein the method further comprises mitigating domain shift between the augmented labeled data and the augmented unlabeled data, based on an adversarial relationship between the adversarial discriminator and the feature extractor, to align statistical properties of the labeled data and the unlabeled data.

9. The computer-implemented method of claim 7, wherein the augmented labeled data is determined by linearly combining the labeled data and the unlabeled data, with a fixed ratio such that the augmented labeled data is similar to the labeled data, and wherein the augmented unlabeled data is determined by linearly combining the unlabeled data and the labeled data, with the fixed ratio such that the augmented unlabeled data is similar to the unlabeled data.

10. The computer-implemented method of claim 1, wherein the method further comprises:
  inputting unlabeled data collected by the device to a trained bi-regressor neural network, wherein the trained bi-regressor neural network includes the feature extractor trained during the third training stage and at least one regressor of the two regressors trained during the second training stage; and
  processing the unlabeled data with the trained bi-regressor neural network to output the location of the device in the environment.

11. The computer-implemented method of claim 1, wherein the method further comprises:
  determining, based on the location of the device in the environment, a motion path for the device to perform a task in the environment; and
  controlling the device based on the motion path.

12. The computer-implemented method of claim 1, wherein the method further comprises tracking the device in the environment, based on the outputted location of the device.

13. The computer-implemented method of claim 1, wherein the device is a robot, and wherein the environment is one of an autonomous factory, a warehouse, or a smart home.

14. A system for training a neural network suitable for localization of a device within an environment based on signals received by the device located in the environment, the system comprising: a processor; and a memory having instructions stored thereon that, when executed by the processor, cause the system to:
  collect labeled data including measurements of the signals labeled with coordinates of locations of the measurements;
  collect unlabeled data including measurements of the signals at unidentified locations within the environment, such that the measurements of the labeled data and the measurements of the unlabeled data are sampled at the same or different discrete locations of the environment;
  train, during a first training stage using the labeled data, a bi-regressor neural network to identify locations in a continuous space of the environment from the labeled data, wherein the bi-regressor neural network includes a feature extractor configured to extract features from the labeled data and a bi-regressor including two regressors with identical architectures, each regressor is trained to determine a location in the continuous space of the environment from the features received from the feature extractor;
  train parameters of the bi-regressor, during a second training stage with fixed parameters of the feature extractor trained during the first training stage, using the labeled data and the unlabeled data, such that each of the two regressors identifies the same labeled locations while processing the labeled data and identifies different locations while processing the unlabeled data;
  train parameters of the feature extractor using an adversarial discriminator, during a third training stage with fixed parameters of the bi-regressor trained during the second training stage using the labeled data and the unlabeled data, to extract domain invariant features from the unlabeled data with statistical properties of the labeled data according to the adversarial discriminator such that each of the two regressors identifies the same locations while processing the domain invariant features;
  input unlabeled data collected by the device to a trained bi-regressor neural network, wherein the trained bi-regressor neural network includes the feature extractor trained during the third training stage and at least one regressor of the two regressors trained during the first training stage using the labeled data; and
  process the unlabeled data collected by the device with the trained bi-regressor neural network to output the location of the device in the environment.

15. The system of claim 14, wherein, during the first training stage, the bi-regressor neural network is trained using a loss function such that the each of the two regressors identifies same locations while processing the labeled data, and wherein the loss function is based on a mean-squared error (MSE) criterion.

16. The system of claim 14, wherein, during the second training stage with fixed parameters of the feature extractor trained during the first training stage, the parameters of the bi-regressor are trained based on a soft-similarity function such that each of the two regressors identifies different locations while processing the unlabeled data.

17. The system of claim 16, wherein, during the second training stage with fixed parameters of the feature extractor trained during the first training stage, the parameters of the bi-regressor are trained based on an objective function such that each of the two regressors identifies the same labeled locations while processing the labeled data and identifies different locations while processing the unlabeled data, and wherein the objective function is based on the loss function and the soft-similarity function.

18. The system of claim 14, wherein the processor is further configured to:
  input unlabeled data collected by the device to a trained bi-regressor neural network, wherein the trained bi-regressor neural network includes the feature extractor trained during the third training stage and at least one regressor of the two regressors trained during the second training stage; and
  process the unlabeled data with the trained bi-regressor neural network to output the location of the device in the environment.

19. A non-transitory computer-readable storage medium embodied thereon a program executable by a processor for performing a method for training a neural network suitable for localization of a device within an environment based on signals received by the device located in the environment, the method comprising:

collecting labeled data including measurements of the signals labeled with coordinates of locations of the measurements;

collecting unlabeled data including measurements of the signals at unidentified locations within the environment, such that the measurements of the labeled data and the measurements of the unlabeled data are sampled at the same or different discrete locations of the environment;

training, during a first training stage using the labeled data, a bi-regressor neural network to identify locations in a continuous space of the environment from the labeled data, wherein the bi-regressor neural network includes a feature extractor configured to extract features from the labeled data and a bi-regressor including two regressors with identical architectures, each regressor is trained to determine a location in the continuous space of the environment from the features received from the feature extractor;

training parameters of the bi-regressor, during a second training stage with fixed parameters of the feature extractor trained during the first training stage, using the labeled data and the unlabeled data, such that each of the two regressors identifies the same labeled locations while processing the labeled data and identifies different locations while processing the unlabeled data;

training parameters of the feature extractor using an adversarial discriminator, during a third training stage with fixed parameters of the bi-regressor trained during the second training stage using the labeled data and the unlabeled data, to extract domain invariant features from the unlabeled data with statistical properties of the labeled data according to the adversarial discriminator such that each of the two regressors identifies the same locations while processing the domain invariant features;

inputting unlabeled data collected by the device to a trained bi-regressor neural network, wherein the trained bi-regressor neural network includes the feature extractor trained during the third training stage and at least one regressor of the two regressors trained during the first training stage using the labeled data; and processing the unlabeled data collected by the device with the trained bi-regressor neural network to output the location of the device in the environment.

* * * * *